United States Patent [19]
Owen

[11] Patent Number: 5,464,888
[45] Date of Patent: Nov. 7, 1995

[54] CURABLE SEALER AND/OR ADHESIVE COMPOSITION, AND A METHOD FOR COATING SAME IN A WET STATE WITH A BASE COAT PAINT, AND COATED SUBSTRATES FORMED THEREBY

[75] Inventor: Ian R. Owen, River Falls, Wis.

[73] Assignee: Minnesota Mining and Manufacturing Company, St. Paul, Minn.

[21] Appl. No.: 221,101

[22] Filed: Mar. 31, 1994

[51] Int. Cl.[6] ................................... C08K 5/3415
[52] U.S. Cl. .................. 524/104; 524/173; 524/233; 524/588; 524/425
[58] Field of Search ........................... 524/104, 173, 524/233, 588, 714, 726, 742

[56] References Cited

U.S. PATENT DOCUMENTS

| | | | |
|---|---|---|---|
| 3,971,751 | 7/1976 | Isayama et al. | 260/37 R |
| 4,122,029 | 10/1978 | Gee et al. | 252/309 |
| 4,191,714 | 3/1980 | Yonezawa et al. | 525/102 |
| 4,310,640 | 1/1982 | Kato et al. | 525/100 |
| 4,444,974 | 4/1984 | Takase et al. | 528/33 |
| 4,730,020 | 3/1988 | Wilfinger et al. | 524/555 |
| 4,923,927 | 5/1990 | Hirose et al. | 524/588 |
| 5,063,270 | 11/1991 | Yukimoto et al. | 525/477 |

OTHER PUBLICATIONS

L. R. Snyder, J. Chromatographic Sci., pp. 223≧234, Jun. 1978, Classification of the Solvent Properties of Common Liquids.

S. C. Ruton, et al, J. Chromatography, 463 (1989) 21–37, Re–Evaluation of the Solvent Triangle and Comparision to Solvatochromic Based Scales of Solvent . . . Selectivity.

"CRC Handbook of Solubility Parameters and Other Cohesion Parameters," edited by Allan F. M. Barton, 2nd ed., CRC Press, 1991, pp. 294–295.

*Primary Examiner*—Mark Sweet
*Attorney, Agent, or Firm*—Gary L. Griswold; Walter N. Kirn; Richard Francis

[57] ABSTRACT

A sealer or adhesive composition based on a polyoxyalkylene polymer having a silicon-containing hydrolyzable group, which has improved compatibility with a base or first paint coat containing acrylic resins. The improvement involves the addition to such a sealer/adhesive composition of a polar organic solvent material having both a Snyder's polarity value in the range of from 6.2 to 7.3 and belonging to Snyder's selectivity group III. In a method of the present invention, the inventive sealer/adhesive composition is wet-on-wet overcoated by a base coat of a multi-coat paint system, where the base coat contains acrylic resin, pigment and auxiliary polar solvents, while retarding and even completely preventing adverse surface defects in the base coat upon its drying (curing), such as cracking or wrinkling therein, to provide an improved coated substrate. Useful polar organic solvent materials that have been found to improve the compatibility of the seam sealer composition with a base coat in this manner have been found to include organic solvent materials such as N-methyl pyrrolidone, dimethyl sulfoxide, N,N-dimethylacetamide, and N,N-dimethylformamide.

18 Claims, 3 Drawing Sheets

CURABLE SEALER AND/OR ADHESIVE COMPOSITION, AND A METHOD FOR COATING SAME IN A WET STATE WITH A BASE COAT PAINT, AND COATED SUBSTRATES FORMED THEREBY

BACKGROUND OF THE INVENTION

1. Field of the Invention

The present invention generally relates to a curable sealer and/or adhesive composition having improved compatibility with wet base coat paints. The invention also relates to a method, and the coated substrates formed by the method, where a base coat paint is coated over such a curable sealer/adhesive composition in a wet state to provide a base coat paint, upon drying, having reduced surface defects.

2. Description of the Related Art

It has been observed that certain conventional seam sealers based on polyethers having hydrolyzable silicon-containing end groups have exhibited a compatibility problem with some automotive aftermarket base coat paints when the base coat is applied onto the fresh (wet) sealer. Examples of such conventional seam sealers are described, for example, in U.S. Pat. Nos. 3,971,751 to Isayama et al. and 4,444,974 to Takase et al. The problem that can occur in use of these conventional seam sealers manifests itself as, at one extreme, a gross failure of the paint to even wet the fresh (wet) sealer. On the other hand, even the base coats which wet the seam sealer often experience cracking and/or a light or "feather edge" phenomena characterized by the paint wrinkling and shrinking slightly away from the edge of the sealer to leave a fine unpainted edge of the sealer. All of these prior base coat defects, including the feather edge problem, are unacceptable in many applications.

The feather edge phenomena is more likely to occur where a sealer bead has been tooled or feathered out, as is typically the case, before application of the base coat thereto. As one specific example, this feather edge problem is seen where the above-mentioned conventional seam sealers are spray painted within 60 minutes with a base coat, especially a base coat based on acrylic resins.

Although these base coat problems feasibly could be avoided if the sealer was permitted to dry to complete cure (at least about 24 hours) before application of the base coat thereto as a wet-on-dry scenario, such a delay naturally would significantly lower productivity and convenience in completing the paint operation as well as creating its own problems, such as a poor paint adhesion of acrylic-based paints to a precured (dried) seam sealer.

It is also feasible to cosmetically mask these cracking and wrinkling defects occuring in the base coats applied over the mentioned conventional seam sealers by applying a relatively thick succession of overcoats with long flash times to the extent necessary to smooth out the replications from the original defect-ridden surface of the base coat. However, in addition to the nuisance and added cost and time of this possible corrective measure, it ultimately may not succeed in all instances in any event, such as where the original surface defects in the base coat are particularly profound. Further, the resulting thickened overall coating layer itself can be expected to be more susceptible to failure, such as cracking, peeling and flaking, than if thinner overcoats could have been utilized in forming the multi-coat paint layering system.

Also, from a practical and productivity standpoint, it is highly desired in the field to apply paint coatings in flashes at relatively short intervals of 2–10 minutes. Therefore, the resort to long flash times in order to create thickened coatings in an attempt to mask any underlying surface defects may not be tolerable in many situations.

As can be understood from the above, the formulations of conventional seam sealers having silicon containing hydrolyzable end groups which have been proposed to date, have disadvantages and as yet unsolved problems when used in conjunction with base coats such as acrylic base coats.

SUMMARY OF THE INVENTION

The present invention relates to a sealer or adhesive composition based on a polyoxyalkylene polymer having silicon-containing hydrolyzable end groups, which has improved compatibility with a base or first paint coat containing acrylic resins. The improvement involves the addition and admixture to such a sealer/adhesive composition of a polar organic solvent material characterized both by (1) a Snyder's polarity value in the range from 6.2 to 7.3, inclusively, and more preferably in the range from 6.45 to 7.3, inclusively, and (2) being a member of Snyder's selectivity group III. More particularly, it has been found that the above-mentioned sealer/adhesive composition of this invention can be wet-on-wet topcoated by a base coat or first coat of a multi-coat paint system, where the base coat incorporates acrylic resin, pigment and auxiliary polar solvents, to provide an improved coated substrate having strongly retarded and even complete prevention of adverse surface defects therein, such as cracking and wrinkling, in the base coat upon its drying (curing). The compositions of the invention also show improved cure profiles in terms of cure rate through the thickness of the sealer/adhesive composition.

Useful polar organic solvent materials that have been found to improve the compatibility of the seam sealer composition with a base coat in this manner have been found to include seemingly chemically disparate yet nonetheless effective types of organic solvent materials such as N-methyl pyrrolidone, dimethylsulfoxide, N,N-dimethylacetamide, and/or N,N-dimethylformamide.

In one embodiment of the sealer/adhesive composition of the invention, there is a curable sealer and/or adhesive composition comprising:

(a) a polyoxyalkylene polymer having a silicon-containing hydrolyzable group at each end of the molecule, where the polyoxyalkylene polymer has a structural unit of formula (I) represented by $-(R^1O)_q-$, where $R^1$ is an alkylene group having 1 to 4 carbon atoms and q is an integer providing an average molecular weight for formula (I) of from about 500 to about 20,000, and the silicon-containing hydrolyzable groups each is independently represented by general formula (II):

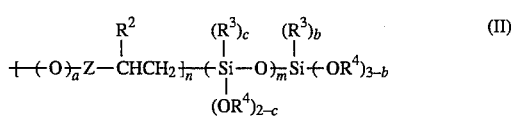

wherein Z is —R—, —R—O—R"—, —R—O—C(O)—, —C(O)NHR—, —C(O)NH—X—NHC(O)—NR"—R—, —C(O)NH—X—NHC(O)—O—R—, —C(O)NH—X—NHC(O)—S—R—, or —C(O)—R—, where R and R" are the same or different and each is a bivalent hydrocarbon group having 1 to 20 carbon atoms, X is an alkylene or aryl group having 1 to 20 carbon atoms, $R^2$ is a hydrogen, a hydrocarbon group having 1–20 carbon atoms, or a triorganosiloxy group, $R^3$ is a substituted or unsubstituted monovalent group having 1–20 carbon atoms or an organosiloxy group, $R^4$ is a saturated or unsaturated monovalent hydrocarbon group having 1–20 carbon atoms, a is 0 or 1, b is 0, 1 or 2, c is 0, 1, or 2, n is 0 or 1 and m is an integer between 0 to 18; and (b) a polar organic solvent material having a Snyder's polarity value in the range from 6.2 to 7.3 and belonging to Snyder's selectivity group III.

"Snyder's polarity value (P')" and "Snyder's selectivity group" (I through VIII) are terms having known meaning in the chemical field and attributable to analytical studies conducted by L. R. Snyder to classify solvent properties of common liquids used as solvents in liquid chromatography "Snyder's polarity" also identified by the variable "(P')" in general, is a relative measure of solvent polarity useful in ranking of a large number of common chromatographic solvents in order of increasing polarity. The polarity scale is adjusted so that the $C_6$–$C_{10}$ aliphatic hydrocarbon solvents have an average P' of zero. A more detailed description of Snyder's polarity parameter is provided later herein. The polar organic solvent materials of the invention have values of P' in the range of from 6.2 to 7.3. The "Snyder's selectivity group III" also has a known meaning and is discussed in greater detail later herein.

Preferably, the polyoxyalkylene polymer having a silicon-containing hydrolyzable end groups component of the sealer composition modified in the present invention contains at least 50% by weight, and even more preferably at least 80% by weight, of the —$R^1O$— backbone chain units. By way of example, one suitable polyoxyalkylene polymer backbone for this invention is polypropylene polyether.

The polyoxyalkylene polymer having the silicon-containing hydrolyzable end groups generally has an average molecular weight between about 500 to about 20,000, and preferably 3,000 to 12,000. The polyoxyalkylene polymer having the silicon-containing hydrolyzable end groups component of the invention typically has a viscosity of between about 100 cps and 200,000 cps at 15° C. At higher molecular weights beyond about 20,000, the viscosity of the polymer may become increased to the point where it is difficult to admix large amounts of any fillers that may be desired. To a certain extent, fillers can provide cost advantages by effectively replacing commensurate amounts of the more costly polymer material.

As the silicon-containing hydrolyzable groups represented by formula (II), each group ordinarily represents an end or terminal group of the polyoxyalkylene polymer. Also, it is preferred that the moiety —$OR^4$ in Formula (II) is an alkoxy group having 1–20 carbon atoms. An especially preferred class of silicon-containing hydrolyzable groups of formula (II) are those where the moiety —$OR^4$ is a methoxy group and where b has a value of 1. Although not thought to be within the preferred scope of the invention, the moiety —$OR^4$ also can be an acyloxy group, a ketoximato group, aminoxy or an alkenyloxy group, or even be replaced entirely by a halogen atom, amino group, amide group or mercaptide group.

The polar organic solvent material of the invention generally is mixed with the polyoxyalkylene polymer material having the silicon-containing hydrolyzable end groups in an amount of at least about 1 part by weight based on 100 parts weight of the overall formulated sealer composition. The general range amount of addition of the polar organic solvent of the invention is from about 1 to about 5 parts per 100 parts of the total weight of the final formulation of the sealer/adhesive composition. The amounts of the polar organic solvent material stated herein apply to the amount of a singly used polar solvent of the present invention, or, if a combination of polar solvents of the invention are employed, the amounts apply to the total amount thereof.

The preferred amount of the organic polar solvent is from 2 to 5 parts by weight based on 100 parts weight sealer composition weight, with the range of 2.5 to 3.5 parts by weight per 100 parts weight sealer composition being most preferred.

The polar organic solvent material generally is contained in an amount of from 1 to 10 parts by weight based more specifically on 100 parts by weight of the polyoxyalkylene polymer having a silicon-containing hydrolyzable groups component alone. Here again, paint problems in the base coat are not always prevented with amounts of the polar solvent less than 1 part by weight, while amounts exceeding about 10 parts by weight per 100 parts polyoxyalkylene polymer solves the paint feathering/cracking problem but special care must be taken to monitor for other problems that can be raised with the higher amounts.

In one highly advantageous application of the sealer composition of this invention, there is a method for applying and curing a coating composition on a curable sealer composition without cracks forming in the coating composition, comprising the steps of:

(1) providing a sealer composition that is curable upon exposure to moisture, comprising (a) a polyoxyalkylene polymer having a silicon-containing hydrolyzable group at each end of the molecule, wherein the polyoxyalkylene polymer comprises a structural unit of formula (I) represented by $-(R^1O)_q$, where $R^1$ is an alkylene group having 1 to 4 carbon atoms and q is an integer providing an average molecular weight for formula (I) of from about 500 to about 20,000, and the silicon-containing hydrolyzable groups each is independently represented by general formula (II):

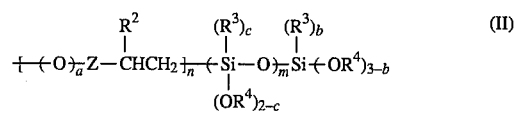

(II)

wherein Z is —R—, —R—O—R"—, —R—O—C(O)—, —C(O)NHR—, —C(O) NH—X—NHC(O)—NR"—R—, —C(O)NH—X—NHC(O)—O—R—, —C(O) NH—X—NHC(O)—S—R—, or —C(O)—R—, where R and R" are the same or different and each is a bivalent hydrocarbon group having 1 to 20 carbon atoms, X is an alkylene or aryl group having 1 to 20 carbon atoms, $R^2$ is a hydrogen, a hydrocarbon group having 1–20 carbon atoms, or a triorganosiloxy group, $R^3$ is a substituted or unsubstituted monovalent group having 1–20 carbon atoms or an organosiloxy group, $R^4$ is a saturated or unsaturated monovalent hydrocarbon group having 1–20 carbon atoms, a is 0 or 1, b is 0, 1 or 2, c is 0, 1, or 2, n is 0 or 1 and m is an integer between 0 to 18, and (b) a polar organic solvent material having a Snyder's polarity value in the range from 6.2 to 7.3 and belonging to Snyder's selectivity group III;

(2) providing a coating composition comprising acrylic resin, pigment, and a polar solvent compound;

(3) applying the sealer composition to a substrate in an environment containing moisture;

(4) before the sealer composition cures completely or

"skins over", applying the coating composition to the curable sealer composition;

(5) drying the coating composition and the sealer composition to cure each to completion.

In one further embodiment of the method of the invention, the applying of the coating composition to the sealer composition in step (4) is performed within 60 minutes, and even from 2 to 10 minutes, after applying the sealer composition to a substrate in step (3).

The curable sealer/adhesive composition of the invention can be provided in a caulk form or as a sprayable form. The viscosities of the caulk version are typically about 700,000–1,200,000 cps, while the spray version is typically about 400,000–700,000, or even as low as about 120,000 for speciality sprayable versions.

The present invention prevents the cracking and feather-edge problems, which prior to this invention, often were observed when certain base coat paints are applied to partially dried seam sealers comprising polyether (polyoxyalkylene) polymers end capped with silicon-containing hydrolyzable groups. Quite unexpectedly, it has now been discovered that the above-mentioned cracking and feather-edge problems can be eliminated when the seam sealer compositions described above are modified to include certain polar organic solvent materials characterized by having a Snyder's polarity value in the range of 6.2 to 7.3 and belonging to Snyder's selectivity group III.

Other embodiments, features and advantages of the present invention will become apparent from the following description of the drawings and preferred embodiments.

DETAILED DESCRIPTION OF THE PREFERRED EMBODIMENT

Figure 1:
FIG. 1 is a photograph showing a top view of a base coat dried of a comparative uncured sealer composition, as described in Example 6.

The addition of certain polar organic solvent materials that have a Snyder's polarity value in the range of from 6.2 and 7.3 and belong to Snyder's selectivity group III to a seam sealer composition based on a hydrolyzable silane end capped polyether or polyoxyalkylene polymer, has been discovered, quite unexpectedly, to prevent cracking and feather edge problems from arising in base coats applied to the seam sealer as a wet-on-wet coating.

The meaning of the Snyder Polarity P' parameter used in characterizing the present invention is further elucidated below. The solvent polarity classification scheme of L. R. Snyder is based on gas-liquid partition coefficients determined by Rohrschneider and summarized in *Analytical Chemistry*, Vol. 45, No. 7, June 1973, pp. 1241–1247 using gas chromatography. Rohrschneider determined the gas-liquid partition coefficients for 81 solvents using n-octane, toluene, ethanol ($x_e$), methyl ethyl ketone, dioxane ($x_d$), and nitromethane ($x_n$) as probe solutes in concentrations sufficiently low so that it is reasonable to assume the resulting solutions were regular solutions. Snyder used Rohrschneider's data to develop his solvent polarity classification scheme, ranked solvents according to their polarity or chromatographic strength (P' values) and "selectivity"— the solvent's relative ability to engage in hydrogen bonding or dipole interactions in terms of several selectivity parameters: $x_e$, proton acceptor; $x_d$, proton donor; and $x_n$, strong dipole. The mathematical interrelationships among the polarity and three selectivity parameters, which provide the theoretical motivation for the Snyder polarity classification scheme, were originally defined by L. R. Snyder in *Journal of Chromatographic Science*, Vol. 16, June 1978, pp. 223–234. Reference can be had to this publication for a detailed description of the meaning of Snyder Polarity P' and selectivity ($x_e$, $x_d$, $x_n$). Generally, the Snyder system first grouped the investigated solvents by observing how they tended to "cluster" when the selectivity parameters, $x_e$, $x_d$, and $x_n$, were plotted on a triangular grid, also referred to as a solvent triangle.

As a result of this cluster analysis, Snyder was able to define eight solvent groups (i.e., groups I–VIII), that with several notable exceptions could be explained on the basis of a given solvent's dominant functional group. The aforementioned Snyder article classifies solvent selectivity among Groups I–VIII, generally as grouped by the dominant functional group, as follows:

I: aliphatic ethers, tetramethylguanidine, hexamethyl phosphoric acid amide, trialkylamines;

II: aliphatic alcohols;

III: pyridine derivatives, tetrahydrofuran, amides (except formamide per se) glycol ethers, sulfoxides;

IV: glycols, benzyl alcohols, acetic acid, formamide per se;

V: methylene chloride, ethylene chloride;

VI: tricresyl phosphate, aliphatic ketones and esters, polyethers, dioxane, sulfones; nitriles, propylene carbonate;

VII: aromatic hydrocarbons, halo-substituted aromatic hydrocarbons, nitro compounds, aromatic ethers;

VIII: fluoroalkanols, m-cresol, water, chloroform.

A more recent publication, viz. CRC HANDBOOK OF SOLUBILITY PARAMETERS AND OTHER COHESION PARAMETERS, edited by Allan F. M. Barton, 2nd edition, CRC Press, 1991, pages 294–295, reports more refined Snyder polarity values and selectivity parameters ($x_e$, $x_d$, $x_n$) for various solvents such as in terms of the number of significant figures, and these Snyder polarity values are the ones incorporated and referred to herein for characterizing the polarity of the solvents investigated for this invention. The Snyder Polarity values reported in the above-mentioned CRC HANDBOOK are understood to be based at least in part by the studies reported in *Journal of Chromatography*, S. Rutan, L. R. Snyder, et al., 463(1989) 21–37, and the Snyder polarity values of solvent materials, for purposes of this invention, should be assessed within the framework of the refined Snyder Polarity equations developed therein, viz., equation (8) therein, which is incorporated herein by reference.

Surprisingly, after investigating a number of diverse solvents, the unexpected advantages of the present invention, and at relatively small amounts of the solvent additive, have been discovered to be associated only with polar organic solvent materials having both a Snyder polarity P' value in the range of from 6.2 to 7.3, and more optimally thereto in the range of from 6.45 to 7.3, and where the solvent also is a member of Snyder selectivity group III. Selectivity group III occupies a given region in the Snyder solvent triangle ($x_e$, $x_d$, $x_n$ coordinates), such as reproduced at page 29 in the above-referenced publication *Journal of Chromatography*, S. Rutan, L. R. Snyder, et al., 463(1989) 21–37, which is incorporated herein by reference.

Further, as another way of characterizing the Snyder's selectivity group III materials and differentiating same from Snyder selectivity groups I, II, IV–VIII, all solvents that are members of Snyder's selectivity group III show an average solvent selectivity to the polar solute methylethylketone ($x_m$) of 0.23±0.01 and all show an average solvent selectivity to the nonpolar solute toluene ($x_t$) of 0.13±0.02, as demonstrated and reported by L. R. Snyder in *Journal of Chromatographic Science*, Vol. 16, June 1978, pp. 223, 228, 229, and 231, and which is incorporated herein by reference.

As shown by the results of the examples described hereinafter, a definite trend was found in the data insofar as a relationship of both of the parameters Snyder's selectivity grouping and Snyder's polarity as associated with a solvent additive used in the sealer composition with the result and efficacy achieved in preventing paint problems.

Suitable polar organic solvents discovered for this invention, which have a Snyder's polarity value between 6.2 to 7.3 and are members of Snyder's selectivity group III, include (with their respective Snyder's polarity value), but are not necessarily limited to, N-methyl-2-pyrrolidone (6.45), dimethylsulfoxide (7.27), N,N-dimethylacetamide (6.45), and N,N-dimethyl formamide (6.31). These materials can be used singly or in combination with each other.

Optimal results have been observed in use of N-methyl-2-pyrrolidone, dimethylsulfoxide or N,N-dimethylacetamide as the polar organic solvent admixed with the polyether or polyoxyalkylene polymer having the hydrolyzable silicon-containing end groups, wherein the base coat, as applied over the wet seam sealer composition, dries and cures to film having no surface defects or only extremely light wrinkles that are virtually undetectable. The use of N,N-dimethylformamide provides less optimal yet fully acceptable results where the base coat has the extremely light wrinkles or only light wrinkles at the worst. As dramatized in the comparative data summarized herein and the FIGS. 1, 2 and 3, a dramatic drop-off in base coat quality is observed where the organic polar solvent added to the mentioned seam sealer composition is selected to be one having a value either below or above a ranges of Snyder's polarity values between 6.2 to 7.3 even if the solvent is a member of Snyder selectivity Group III.

The polar organic solvent material of the invention, generally, is mixed with the polyoxyalkylene polymer material having the hydrolyzable silicon end group in an amount of at least about 1 part by weight based on 100 parts weight of the sealant composition. A preferred range amount of use of the polar organic solvent materials of the invention is about 1 part to 5 parts by weight solvent per 100 parts of the total sealant composition including the polyoxyalkylene polymer material having the hydrolyzable silicon end group.

Paint problems of feathering and/or cracking in the base coat are not always prevented with amounts of the polar solvent of the invention which are less than 1 part by weight per 100 parts sealer composition. On the other hand, while amounts of the polar organic solvent exceeding 5 parts by weight of the solvent of the invention per 100 parts sealer composition of the present invention usually solve the paint problem, and are thus thought within the scope of the present invention, care nonetheless must taken at these higher amounts which can lead to other problems, such as the tack-free time of the sealer composition being slowed.

Further, for example, when the polar solvent is N-methyl pyrrolidone and the amount thereof exceeds 5 parts by weight per 100 parts by weight sealer composition, the paint surface defects are prevented in the base paint coat applied thereon; however, small droplets of N-methyl pyrrolidone occasionally appear on the surface of the cured/skinned sealer composition after about 24 hours. Alternatively, if the sealer composition containing an amount of N-methyl pyrrolidone exceeding 5 parts per 100 parts by weight of the sealer composition is inadvertently permitted to artificially age, such as in an environment of 49° C. for 2–4 weeks, then the N-methyl pyrrolidone is often observed to separate from the bulk of the sealer composition which can impair the integrity of the sealer and any overlying paint coatings and/lacquers.

In any event, either N-methyl pyrrolidone and dimethyl sulfoxide is especially preferred as the polar organic solvent material, and each is preferably used in amounts in the range of 2.5 to 3.5 parts by weight based on 100 parts weight of the sealer/adhesive composition.

The polar organic solvent material generally is contained in an amount of from 1 to 10 parts by weight based alone on 100 parts by weight of the polyoxyalkylene polymer having a silicon-containing hydrolyzable groups component. Here again, paint problems in the base coat are not always prevented with amounts of the polar solvent less than 1 part by weight, while amounts exceeding about 10 parts by weight per 100 parts polyoxyalkylene polymer solves the paint feathering/cracking problem but special care must be taken to monitor for other problems, such as described above.

Also, it is thought that certain solvent additives that are outside the scope of the present invention, that is, solvents having a Snyder's polarity outside the range of 6.2 to 7.3 and/or being a member of a Snyder selectivity group other than group III, such as gamma-butyrolactone and some conventional thickeners or plasticizers, may mitigate the feathering problem if loaded into the sealer in very high amounts such as about 10% by weight or higher amounts based on the sealer composition, but that these high amounts tend to bring serious drawbacks, such as causing an unacceptable degree of shrinkage in the paint during its drying, or causing a paint stripping action, or causing increased solvent handling/disposal demands, and leading to increased cost.

In contrast, one salutary aspect of the solvents of the present invention has been found to be the ability to use these materials in relatively small addition amounts to nonetheless prevent feathering and other paint problems described herein, that is, such as mixed with the polyoxyalkylene polymer material having the hydrolyzable silicon end group in an amount of from only about 1 to about 5 parts by weight based on 100 parts weight of the sealant composition.

While not desiring to be bound to any theory at this time, it is believed that feather edge problem in the base coat applied to conventional seam sealer compositions is related to a combination of two major factors. First, acrylic resins in base coats are found to be grossly incompatible with the conventional seam sealer compositions mentioned herein.

For instance, this incompatibility has been verified in a straightforward manner by mixing a range of acrylic resins acquired from Rohm and Haas Chemical Co. under the tradenames "ACRYLOID A-21", "ACRYLOID B48S" and "ACRYLOID AU608B", with commercially available dimethoxy silane end-capped polyethers of the tradename "SILMOD" series under tradename designations "SILMOD-SAT10", "SILMOD SAT30", "SILMOD SAT 200", "SILMOD S203", "SILMOD S303", "SILMOD 20A", to name several, which were obtained from Union Carbide Company. The acrylics are supplied in solution but are observed to shock out of the system as soon as mixed with such tradenamed "SILMOD" type resins. It is explained that tradenamed "SILMOD" resins are the same basic chemistries as some tradenamed "MS" resins available from Kanegafuchi Kagaku Kogyo Kabushiki Kaisha, Osaka Japan, e.g., the sealer available under tradename "SILMOD S203" corresponds to the sealer available under tradename "MS S203", the sealer available under tradename "SILMOD S303" corresponds to the sealer available under "MS S303", and the sealer available under "SILMOD 20A" corresponds to the sealer available under "MS 20A". Further, the tradenamed "SILMOD" resins are the same basic chemistries as some tradenamed "SILYL" resins also available from Kanegafuchi Kagaku Kogyo Kabushiki Kaisha, Osaka Japan, e.g., the sealer available under "SILMOD SAT10" corresponds to the sealer available under tradename "SILYL SAT10", the sealer available under "SILMOD SAT30" corresponds to the sealer available under "SILYL SAT30", and the sealer available under "SILMOD 200" corresponds to the sealer available under "SILYL 200".

Secondly, the large difference in surface energy between the low surface energy tradenamed "SILMOD", "MS" or "SILYL" type sealer resins and the high surface energy of the applied base coat is also thought to contribute to their poor compatibility.

Conventional wisdom would suggest that the use of wetting aids or substrate wetting agents should improve or solve the feather edge problem. However, experimentation by the inventor has revealed that this is not the case, and, in fact, in most cases the paint incompatibility problem was aggravated, changing from the feather problem to a gross non-wetting problem.

The inventor has discovered that the addition of at least about 1 part per 100 parts sealer of a polar organic solvent characterizable by a Snyder's polarity value of from 6.2 to 7.3, inclusively, and being a member of Snyder selectivity group III, solves the paint-over-problem. It is believed that the types of polar organic solvent materials used in this invention both raise the surface energy of the sealer composition to that of the paint and also makes the sealer composition more chemically compatible with the base coat paint due to its good solvating power for the acrylic resins in the base coat. It is thought that the polar organic solvent used in this invention, such as N-methyl pyrrolidone, behaves substantially as an "anti-surfactant" at the interfacial surface to reduce the surface tension differences between the sealer surface and the applied drying paint film.

Suitable commercial sources of the (a) polyoxyalkylene polymer having a silicon-containing hydrolyzable group that can be used in the sealer/adhesive composition of the present invention, which often contain other optimizing additives not inclusive of the (b) polar organic solvent material of the sealer/adhesive composition of the present invention, include those available under the tradenames "SILYL SAT10", "SILYL SAT30", "MS S203", "MS S303", "SILYL SAT200", "MS 300" or "MS 20A", all manufactured by Kanegafuchi Kagaku Kogyo Kabushiki Kaisha, Osaka Japan, and mixtures thereof, such as a 50:50 mixture by weight of-the sealer materials available under tradenames "SILYL SAT30" and "MS S303". All these polyoxyalkylene polymeric materials have a polypropylene backbone and end groups which are:

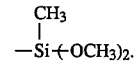

Further, the sealer material available under the tradename "SILYL SAT10" has a molecular weight of approximately 3,000. "SILYL SAT30" is lightly branched in the backbone with a molecular weight of about 5,000. "MS S203" has a linear backbone and molecular weight of about 7,500. "MS S303" has a branched backbone and molecular weight of about 8,500. "SILYL SAT30" is lightly branched and has a molecular weight of about 5,000. "SILYL SAT200" is lightly branched and has a molecular weight of about 8,000. "MS 300" is basically "MS S303" except it further contains 5% dioctyl phthalate. "MS 20A" is basically "MS S203" with 5% dioctyl phthalate added. These sealer materials are curable at room temperature in the presence of water moisture, such as atmospheric water moisture.

Other useful commercial sources of a polyoxyalkylene polymer having a silicon-containing hydrolyzable group comparable to the tradename "MS" chemistry that can be used in the present invention are sealer compositions available from Teroson, under the tradename "9320", and Kommerling, under the tradename "K211" and "K222". The (b) polar organic solvent material of the present invention can be added to and admixed with such commercially available sealer compounds as the (a) polyoxyalkylene polymer of the present invention to formulate the overall curable sealer/adhesive composition of the present invention.

Usual fillers and usual plasticizers optionally can be incorporated in the sealer/adhesive composition of the present invention to improve such properties as storage stability, adhesive capability, elongation at break and hardened mechanical strength.

Examples of such fillers include, for example, reinforcing fillers such as fumed silica, precipitated silica, silica aerogel and carbon black, and the like; other particle fillers such as calcium carbonate, magnesium carbonate, kaolin, talc, titanium dioxide, aluminum silicate, diatomaceous earth, ferric oxide and zinc oxide, and the like; ceramic microspheres or glass microbubbles; and fibrous fillers such as glass fibers and other filaments. The ceramic microspheres that can be used are those available under the tradenames "ZEOSPHERES" or "Z-LIGHT" from 3M. Treated calcium carbonate is preferred. Such treated calcium carbonates are available under the tradenames "ULTRAPFLEX", "SUPERFLEX", "HIPFLEX" and "HITHIX" from Specialty Minerals; and "WINNOFIL S", "SPT", "WMS" from ICI, "HUBERCARB M", "HUBERCARB Q" and "HUBERCARB S" from Huber. The above fillers can be used alone or in combination.

The filler can be contained in the sealer/adhesive composition in an amount of 0 to 500 parts by weight, preferably 0.1 to 300 parts by weight, per 100 parts by weight of the polyoxyalkylene polymer component. The more preferred amount of filler being 80–150 parts per 100 parts polyoxyalkylene polymer component for sub micron size filler, and 50–300 parts per 100 parts polyoxy-alkylene polymer component for greater than micron size such as when used with a thixotrope. Lower amounts of filler can lead to increased overall sealer cost and less reinforcing effect, while higher amounts of filler can lead to very viscous materials which are not easy to handle.

Usual plasticizers also can be used in the invention to increase breaking elongation and facilitate use of larger amounts of fillers. Exemplary plasticizers include phthalates such as dioctyl phthalate, diisodecyl phthalate, butylbenzyl phthalate, chlorinated paraffin, epoxidized soybean oil, polyols and the like. Useful sources of dioctyl and diisodecyl phthalates include those available under the tradenames "JAYFLEX DOP" and "JAYFLEX DIDP" from Exxon Chemical, "SANTICIZER 160", "SANTICIZER 261" and "SANTICIZER 278" from Monsanto. Useful polyols also include low molecular weight polyols in the 500–4000 range, such as the one available under the tradename "PPG" from Arco.

The plasticizer generally can be used in an amount of 0 to 200 per 100 parts by weight of the polyoxyalkylene polymer component. For a caulk version of the sealer composition of the invention, the preferred amount of plasticizer is 25 to 200 parts by weight, more preferably 30–60 parts by weight. For a sprayable version of the sealer composition of the invention, the preferred amount of plasticizer is 50 to 150 parts by weight, more preferably 80–120 parts by weight. Lower amounts of plasticizer can reduce elastic properties, and can lead to reduced atomization for sprayable versions of the sealer of the invention. Higher amounts can lead to sticky or nontack free sealer compositions with long times needed to achieve a tack free and cured condition. Although not required, it is preferable to dehydrate the filler and/or plasticizer by heat drying to decrease the water content before admixture to the sealer composition of the invention.

It is also possible to add other adjuvants such as a curing accelerator or catalyst to the polyoxyalkylene polymer. The curing accelerator acts as a hardener to provide a one component room temperature curing composition. Where moiety —$OR^4$ in formula (II) is an alkoxy group, the curing velocity may be relatively slow, and, in that case, it is desirable to add a curing accelerator such as a dibutyltin acetyl acetonate, dibutyl tin oxide, dibutyl tin dilaurate, tin carboxylate, each alone or as combined with an amine cocatalyst. Other useful curing accelerators are described in U.S. Pat. No. 3,971,751. Useful sources of a catalyst include those available under the tradenames "DABCO" from Air Products, "TYZOR" from Dupont Chemical, "DOVERCAT" from Dover, "NIAX" from OSI. Useful sources of amine cocatalysts are those available from Akzo Company.

The curing accelerator generally is used in amount of between 0.2 to 5 weight parts, preferably 0.5 to 2 parts, based on 100 parts of the polyoxyalkylene polymer component. Higher amounts of the catalyst can lead to reduced shelf life, while lower amounts can lead to slower cure speeds. The amount of amine cocatalyst can be in the range of 0 to 10 parts per 100 parts polyoxyalkylene component.

Thixotropes or antisagging agents that can be used include castor waxes, fumed silicas, treated clays, polyamides and the level of usage is not dependant on type of material, but generally it is greater than 0 to 10 parts per 100 parts polyoxyalkylene component by weight. The preferred thixotrope is polyamide used in an amount of 1–3 parts per 100 parts polyoxyalkylene component. Lower amounts can lead to poor sag control and higher amounts can lead to unacceptably high viscosities. Useful sources of the thixotrope include those available under the tradenames "AEROSIL" from Degussa, "TS720" from Cabot, "CASTORWAX" from Caschem, "BENTONE", "THIXATROL" and "THIXCIN" from Rheox, and "DISLON" from King.

Other optional additives for the sealer/adhesive composition of the invention include any of an antioxidant, an adhesion promoter, a water scavenger, a colorant, a pigment, and a U.V. stabilizer.

U.V. stabilizers or antioxidants can be used in an amount of from 0–5 parts per 100 parts polyoxyalkylene component. These materials improve heat stability and UV resistance, although the later effect is less important when the sealer composition of the invention is painted over. Useful sources of U.V. stabilizers and antioxidants include those available under the tradenames "TINUVIN 770", "TINUVIN 327", "TINUVIN 1130" and "TINUVIN 292" from Ciba-Geigy.

Useful adhesion promoters include various silanes. The amount of adhesion promoters can be used in an amount of from 0–5 parts per 100 parts polyoxyalkylene component. Lower amounts can lead to poor adhesion while higher amounts can lead to increased brittleness of the cured sealer and increases cost. Useful sources of adhesion promoters include those available under the tradenames "A1120", "A187", and "A189" from OSI and "Z9020" from Dow Chemical.

Silanol condensation catalysts and water scavengers also can be used. For example, a hydrolyzable silicon compound stabilizer can be used as a water scavenger during storage. Other examples of water scavenger components include those exemplified in U.S. Pat. No. 4,444,974. A useful water scavenger includes the one available under the tradename "A171" from OSI. The water scavenger can be used in an amount of 0 to 10, preferably 1–3, parts per 100 parts polyoxyalkylene component. Lower amounts of water scavenger can lead to faster cure rates but decreased shelf life and higher amounts can lead to excellent shelf life but greatly reduced cure and tack free times.

In the inventive process, the procedure for mixing of the polyoxyalkylene polymer, polar solvent, fillers, curing accelerator, plasticizers, and other additives may be performed in any convenient manner with any convenient equipment. However, in order to ensure good storage stability, it is preferred to dehydrate and remove any water residue of each component before mixing. Further, the mixing preferably should be conducted in an environment free of atmospheric water moisture. By preliminarily mixing all components, a single part type of sealing material can be provided. However, it is possible to divide the various components into two or more separate parts before complete mixing and provide a two (or more) part type of sealing system. When the sealing material is needed for use, the two parts would be mixed together at that time and applied.

Conventional mixing equipment can be employed for admixing the sealer composition components, such as a high shear or planetary mixer with mixing conducted under a vacuum or a nitrogen atmosphere with optional usage of heat. For example, an appropriate mixing vessel, such as high shear or planetary type, can be flushed with nitrogen and then the desired resin types, plasticizers and antioxidant and/or UV stabilizer and colorant are added thereto. If preparing a sprayable formulation of the sealer composition of the invention, a thixatrope is also added at this stage. Then, the mixture, whether intended ultimately for sprayable or caulkable versions, is mixed and heated (typically 60°–100° C.) for 15 minutes, and then the predried fillers are added. In the case of the sprayable formulation, these fillers typically are selected to have a 1 micron or greater average particle size and for the caulkable version the major filler should be submicron in size to control thixotropy. The above process scheme for the caulkable version without the step of adding a thixotrope is often preferred as it allows for making a much heavier bodied caulk grade sealer than by using a thixatrope/filler combination. However, it is to be understood that the caulk version optionally could be made including a thixatrope, as per the sprayable version, and with similar coarser fillers of greater size than 1 micron, if the heavier bodied grade is not required or desired.

In any event, the mixture at this stage is further high shear mixed at temperature and ideally under vacuum to further dehydrate for 15–180 minutes, typically about 45 minutes. The mixture is then cooled to 38°–43° C. and then a dehydrating silane and the polar organic solvent, such as N-methyl pyrrolidone, is added. Then, further mixing and dehydrating is performed at this cooled temperature under nitrogen with high speed for 30–180 minutes, typically 45–60 minutes. Finally, the adhesion promotor, catalyst and any cocatalyst are added and mixed under vacuum for 15–60 minutes, typically about 15 minutes. The sealer/adhesive composition is then ready for packaging, preferably by a moisture free process.

The curable sealer/adhesive composition of the present invention should be maintained in an-anhydrous state and not exposed to water and water moisture until used and applied to a substrate to mitigate and prevent premature cure. Preferably, the sealer/adhesive composition of the invention, including the admixture of the (a) polyoxyalkylene polymer and the (b) polar organic solvent material, as well as any optional additives, is hermetically sealed and packaged in an airtight manner by known means and equipment to curb premature cure before usage.

The inventive mixture of the polyoxyalkylene polymer and prescribed polar organic solvent material is useful as an elastic sealant of the single part type having desirable curing ability at room temperature and can be effectively employed for cars, roads, ships, aircraft, building construction, and other sealing applications in general. Also, the inventive mixture, solely or as assisted by a primer, can be effectively used as an adhesive for bonding a wide variety of surfaces, such as metal, porcelain, glass, wood, rubber, and polymeric material, and so forth.

In one preferred mode of the invention, the inventive sealant/adhesive composition is used to advantage in a wet-on-wet coating situation with a base paint coat to relieve feather phenomena or paint cracking in the base coat. It has been found that this relief is most needed where the base coat contains acrylic resin solids and a relatively aggressive polar solvent, such as propylene glycol methyl ethers or esters. Exemplary acrylic resin solids and base coat compositions include those such as described in U.S. Pat. No. 4,730,020 to Wilfinger et al.

Examples of commercially-available base coats which have been found to achieve improvements in avoiding feather edge problems in wet-on-wet uses in conjuntion with the inventive sealer composition include those available under the tradenames "SIKKENS AUTONOVA" and "SIKKENS AUTOBASE", products of Sikkens, Sassenheim Holland; "PPG DELTRON" universal basecoat and "PPG DELSTAR" acrylic enamel, from Pittsburg Paint & Glass Inc., Strongsville Ohio; "R-M DIAMONT" basecoat, from BASF Corp., Dearborn Mich.; and Sherman Williams "ULTRABASE 7", from Sherman Williams, Cleveland, Ohio.

The application of the base coat can be carried out in any convenient manner using any convenient equipment for this purpose. Preferably, the base coat is applied over a substrate and the preapplied sealer composition as a uniform light coating. This can be accomplished by applying the base coat on the substrate by compressed air spraying. Alternatively, the base coat can be applied electrostatic spraying or air-assisted electrostatic spraying, or combinations thereof. After a flash-off time of about 5 to 10 minutes at room temperature, the base coat can be wet-on-wet coated with additional paint layers or a transparent top coat. The transparent top coat can be a conventional solvent-dissolved paint, water-dilutable paint, or powder coating involving one or two part acrylic-based varnishes. The multiple coat is cured at the temperature required for any clear top coat.

Also, if a reduced flash-off time is desired, or in high humidity environments, it may be advisable to provide a hot-blast zone prior to the application of the transparent top coat.

The following nonlimiting examples will further illustrate the invention. All parts, percentages, ratios, and the like, in the following examples are by weight unless indicated otherwise. Further, the parts, percentages, ratios and the like for the sealer compositions are based on total weight of the sealer formulation unless indicated otherwise. For instance, "phr" means based parts per hundred sealer resin.

EXAMPLES

Example 1

An exemplary caulk version of the sealer of the invention, designated Caulk Seam Sealer 1, was prepared in the following manner.

To a nitrogen flushed high shear reactor there was added 60 grams of polyoxyalkylene sealer having a silicon-containing hydrolyzable group available under the tradename "SILMOD SAT30" and 120 grams of a different polyoxyalkylene sealer available under the tradename of "SILMOD S303", 60 grams of di-iso decyl phthalate and 2 grams of antioxidant under the tradename "TINUVIN 770". The mixture was mixed at low shear for 5 minutes and then warmed to about 77° C. Then, 80 grams of surface-treated calcium carbonate (3 micron average) under the tradename "HIPFLEX" was added with 240 grams of surface-treated calcium carbonate (0.07 micron) under the tradename "ULTRAPFLEX" these being pre dried previously overnight at 104° C., and a full vacuum was applied and mixing with heat and high shear for 45 minutes. The mixture was cooled to 41° C. and the vacuum broken and nitrogen introduced into the reactor. Then 18 grams of N-methyl pyrrolidone and 4 grams of vinyl trimethoxy silane under the tradename "A171" was added and mixed for 45 minutes at this temperature at high shear and under nitrogen. Then 6 grams of N-beta (amino ethyl) gamma amino propyl trimethoxysilane under the tradename "A1120" and 4 grams of dibutyl tin diacetylacetonate catalyst were added and mixed for 15 minutes. The mixture was degassed for 2 minutes under full vacuum and then packaged immediately in a container flushed previously with nitrogen.

Example 2

An exemplary caulk version of the sealer of the invention, designated Caulk Seam Sealer 2, was prepared in the following manner.

To a nitrogen flushed high shear reactor there was added 60 grams of polyoxyalkylene sealer having a silicon-containing hydrolyzable group available under the tradename "SILMOD SAT30" and 120 grams of a different polyoxyalkylene under the tradename of "SILMOD S303", 60 grams of di-iso decyl phthalate and 2 grams of antioxidant under the tradename "TINUVIN 770". The mixture was mixed at low shear for 5 minutes and then warmed to about 77° C. Then, 80 grams of ceramic microspheres under the tradename "ZEOSPHERES 200" was added with 240 grams of surface-treated calcium carbonate (0.07 micron) under the tradename "ULTRAPFLEX", these being pre dried previously overnight at 104° C., and a full vacuum was applied and mixing with heat and high shear for 45 minutes. The mixture was cooled to 41° C. and the vacuum broken and nitrogen introduced into the reactor. Then 18 grams of N-methyl pyrrolidone and 4 grams of vinyl trimethoxy silane under the tradename "A171" was added and mixed for 45 minutes at this temperature at high shear and under nitrogen. Then 6 grams of N-beta (amino ethyl) gamma amino propyl trimethoxysilane under the tradename "A1120" and 4 grams of dibutyl tin diacetylacetonate catalyst were added and mixed for 15 minutes. The mixture was degassed for 2 minutes under full vacuum and then packaged immediately in a container flushed previously with nitrogen.

Example 3

An exemplary sprayable version of the sealer of the invention, designated Sprayable Seam Sealer 1, was prepared in the following manner.

To a nitrogen flushed high shear reactor was added 200 grams of polyoxyalkylene sealer having a silicon-containing hydrolyzable group available under the tradename "SILMOD SAT30", 180 grams of di-iso decyl phthalate and 2 grams of an antioxidant under the tradename "TINUVIN 770". Mixing was conducted at low shear for 5 minutes and then warmed to about 77° C. Then, 15 grams of a thixotrope under the tradename "DISLON 6500" was added and mixed at high shear for 15 minutes. Then, 300 grams of a surface-treated calcium carbonate (3 micron average) under the tradename "HIPFLEX" that had been predried over night at 104° C., was added, and a full vacuum was applied, and mixed with heat and high shear for 45 minutes. The mixture was cooled to about 41° C. and the vacuum broken as nitrogen was introduced into the reactor. Then, 34 grams of N-methyl pyrrolidone and 4 grams of vinyl trimethoxy silane under the tradename "A171" was added and mixed for 45 minutes at this temperature at high shear and under nitrogen. Then, 6 grams of N-beta (amino ethyl) gamma amino propyl trimethoxysilane under the tradename "A1120" and 4 grams of dibutyl tin diacetyl acetonate catalyst was added and mixed for 15 minutes. The mixture was then degassed with full vacuum for 2 minutes and then packaged immediately in a container flushed previously with nitrogen.

Example 4

An exemplary sprayable version of the sealer of the invention, designated Sprayable Seam Sealer 2, was prepared in the following manner.

To a nitrogen flushed high shear reactor was added 200 grams of polyoxyalkylene sealer having a silicon-containing hydrolyzable group available under the tradename "SILMOD SAT30", 180 grams of di-iso decyl phthalate and 2 grams of an antioxidant under the tradename "TINUVIN 770". Mixing was conducted at low shear for 5 minutes and then warmed to about 77° C. Then, 15 grams of a thixotrope under the tradename "DISLON 6500" was added and mixed at high shear for 15 minutes. Then, 300 grams of a surface-treated calcium carbonate (3 micron average) under the tradename "HIPFLEX" and 100 grams of ceramic microspheres under the tradename "ZEOSPHERES 200", that had been predried over night at 104° C., was added, and a full vacuum was applied, and mixed with heat and high shear for 45 minutes. The mixture was cooled to about 41° C. and the vacuum broken as nitrogen was introduced into the reactor. Then, 34 grams of N-methyl pyrrolidone and 4 grams of vinyl trimethoxy silane under the tradename "A171" was added and mixed for 45 minutes at this temperature at high shear and under nitrogen. Then, 6 grams of N-beta (amino ethyl) gamma amino propyl trimethoxysilane under the tradename "A1120" and 4 grams of dibutyl tin diacetyl acetonate catalyst was added and mixed for 15 minutes. The mixture was then degassed with full vacuum for 2 minutes and then packaged immediately in a container flushed previously with nitrogen.

Example 5

A standard paint-over-test on a seam sealer formulation of this invention and comparative formulations was performed as follows. The seam sealer was applied to a freshly degreased cold rolled steel or e-coat primed panel. Degreasing consisted of the sequence of one wipe with methyl ethyl ketone (MEK), one with toluene and a further one with MEK. The caulked bead of sealer was then tooled out to a film using a wooden applicator. The wooden applicator was used to tool the sealer to a film which is 2–5 mm deep in the center with tapering at the bead edges out onto the substrate. This procedure was done to simulate a customer type application where the seam sealer typically is tooled out and not just applied as a bead. The sealer was allowed to cure at ambient or CT room conditions (24° C., 50% relative humidity) a pre-set amount of time described in Table 1 below before the base coat paint is applied, and no primer is used. The paint was applied according to the manufacturer's recommendations, described hereinafter, for dilution, application, number of coats and flash time and final cure conditions. Flash time between coats and final cure were done at room temperature conditions. In all cases, the final clear coat was not applied to the base paint coat.

As the paint in each test dried/cured, the paint film was inspected for any defects which, although may not appear initially, appeared in several tests indicated in Table 1 as the paint films began to dry. These defects appeared as soon as 5 seconds into cure for non wetting cases and as long as 5 minutes into cure for very fine feather edge phenomena. The sealers tested are summarized in Table 1 with the cure times before painting as indicated. The key to the test results are summarized after Table 1.

As the types of sealers investigated for this example, test 1C was a caulk made according to Example 2 except without the N-methyl pyrrolidone being added; test 2 was a caulk made according to Example 2 of this invention; test 3 was a caulk made according to Example 2 but with 5% N-methyl pyrrolidone being added instead of 3%; test 4C was a spray made according to Example 4 except with the "DISLON 6500" being replaced by 4% fumed silica without N-methyl pyrrolidone; test 5C was a spray made according to Example 4 except no N-methyl pyrrolidone was used; and test 6 was a spray made according to Example 4 of this invention.

The various types of paint types investigated, as applied over the sealers, were as follows:

Paint A=Sikkens "AUTOBASE";

Paint B=Sikkens "AUTONOVA";

Paint C=PPG "DELTRON UNIVERSAL BASE";

Paint D=PPG "DELSTAR";

Paint E=R-M "DIAMONT" base coat;

Paint F=Dupont "CHROMABASE"; and

Paint G=Sherwin Williams "ULTRABASE 7".

Paints B and D were 2 pack acrylic-urethane paints and not base coat/clear coats as in Paints A, C, E, F and G.

The various paint manufacturer's recommendations were followed for applying the paints as a base coat over the sealer.

A: Sikkens "AUTOBASE"*: mixed 1 part basecoat to 1 part reducer, applied 3 coats with 5 minutes flash time and allowed to cure.

B: Sikkens "AUTONOVA": mixed base:hardener:reducer at 100:50:30 parts, applied 3 coats with 5 minutes flash time and allowed to cure.

C: PPG "DELTRON"*: mixed basecoat:reducer at 1:1.5, appled 2 coats with 10 minutes flash and then allowed to cure.

D: PPG "DELSTAR": mixed basecoat to DXR80 reducer 8:1, appled to 3 coats with 15 minutes flash time and then allowed to cure.

E: R-M "DIAMONT"*: mixed basecoat:reducer 1:1, appled to 3 coats with 5 minutes flash time and allowed to cure.

F: Dupont "Chromabase"*: mixed basecoat:reducer 1:1, applied 3 coats with 5 minutes flash time and allowed to cure.

G: S-W "ULTRABASE"*: mixed basecoat:reducer 1:1, applied 3 coats with 5 minutes flash time and allowed to cure.

In all cases where the paints were base clear systems (indicated with *), only the base coat was applied, as there was no need to apply any further recommended clear coat as the paint crack problem can be seen with the base coat only and applying another clear coat has no other relevant effect to this investigation. All paints were spray applied at $3.1 \times 10^5$ Pa air pressure. Final cure in all cases was conducted overnight at room temperature.

TABLE 1

| Test | Cure Time (min) | Paint Type | | | | | | |
|---|---|---|---|---|---|---|---|---|
| | | A | B | C | D | E | F | G |
| 1C | 0 | FE2 | P | P/FE1 | P | P | P | FE2 |
| 1C | 45 | FE2 | P | P/FE1 | P | P | P | FE1 |
| 2 | 0 | P | P | P | P | P | P | P |
| 2 | 45 | P | P | P | P | P | P | P |
| 3 | 0 | P | P | P | P | P | P | P |
| 3 | 45 | P | P | P | P | P | P | P |
| 4C | 0 | NW | P | NW | P | NW | P | — |
| 4C | 45 | NW | P | NW | P | NW | P | — |
| 5C | 0 | FE1 | P | P | P | FE2 | P | FE2 |
| 5C | 45 | P | P | FE1 | P | FE1 | P | FE1 |
| 6 | 0 | P | P | P | P | P | P | P |
| 6 | 45 | P | P | P | P | P | P | P |

Key to test responses
P = perfect paint film with no defects
PH = very fine pinholes, not extending to sealer surface
FE = feather edge problem, subdivided into 3 classes:
FE1 = less than 10 percent of painted sealer edge showed the problem;
FE2 = 10–25% of painted sealer edge showed the problem;
FE3 = 25 or more of painted sealer edge showed the problem.
NW = non wetting of paint over whole sealer surface and not merely nonwetting at the edges.

Figure 4:
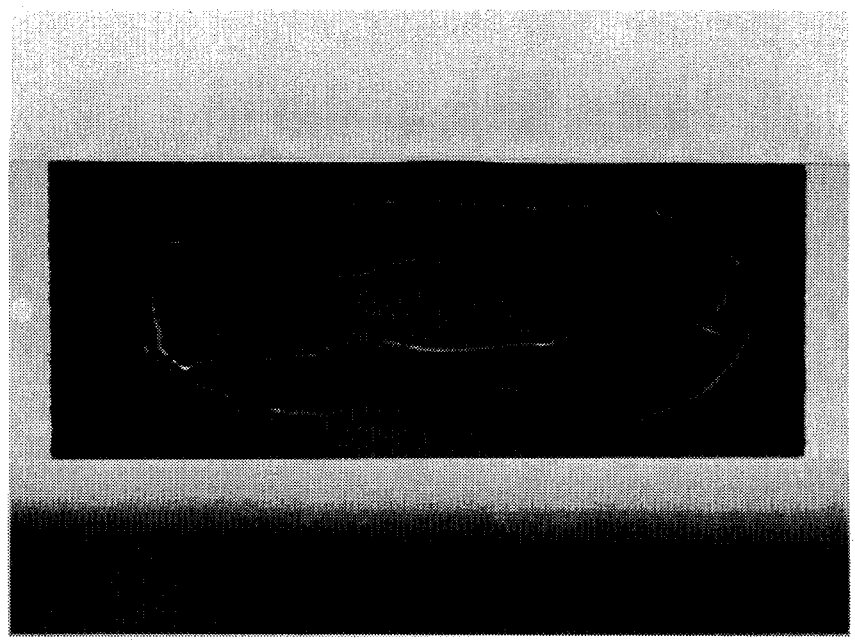
FIG. 4 is a photograph showing a top view of a base coat dried on a cured sealer composition having a feather edge defect, as described in Example 5.
Figure 5:
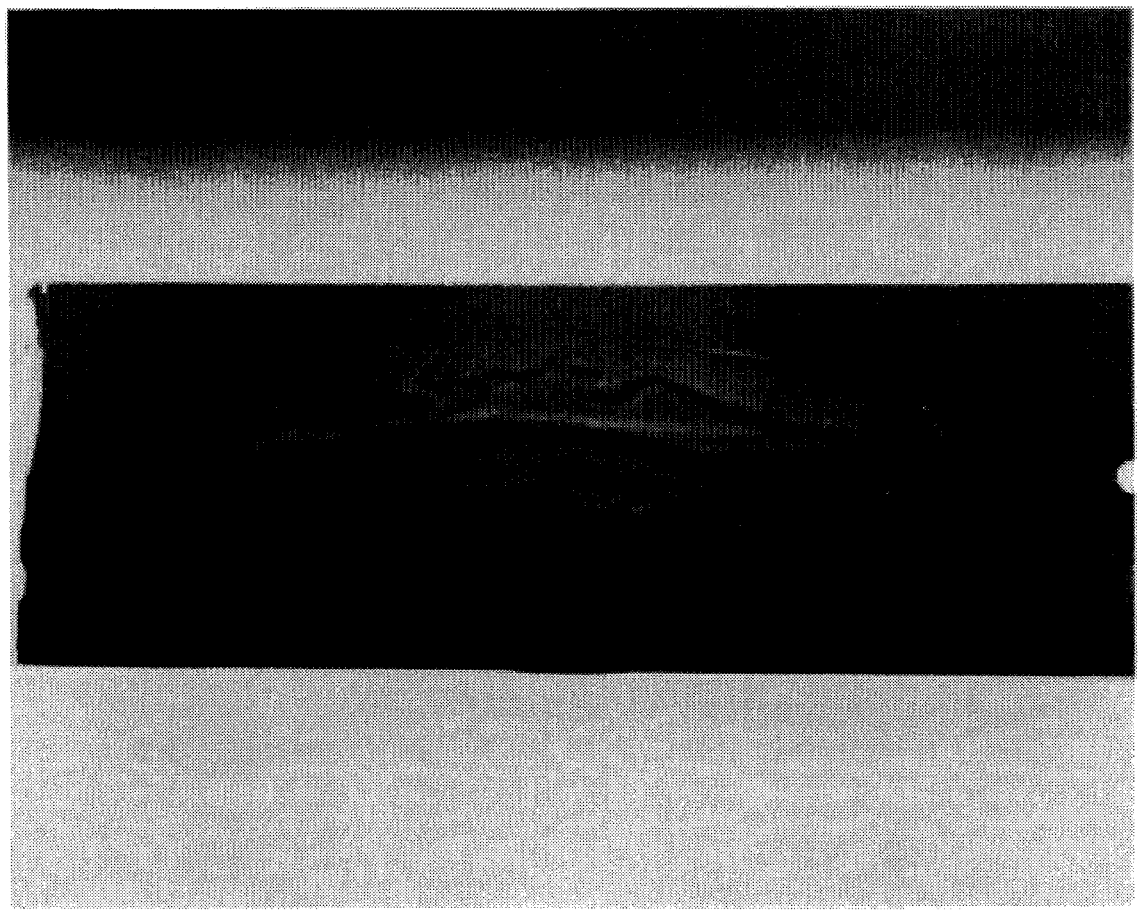
FIG. 5 is a photograph showing a top view of a base coat dried on a cured sealer composition of this invention, as described in Example 5.

A "FE2" category film is shown in FIG. 4 while a "P" category film is shown in FIG. 5.

The above-noted defects typically were more aggravated in the first coat of paint applied than any second or further overcoat that may have been recommended.

As the results showed with standard two pack paints, i.e., paints B and D, no paint problems are observed for tests 2, 3 and 6 of this invention using a caulk or spray version of the sealer of the invention containing the N-methyl pyrrolidone. In contrast, the feather edge or gross non wetting problem was seen in base coat paints painted on comparative sealers 1C, 2C, 4C and 5C lacking N-methyl pyrrolidone or another solvent having a Snyder's polarity in the range of from 6.2 to 7.3, with some being worse than others, and the Dupont "CHROMABASE" showed fewer problems compared to the rest. The effect in the spray formulation tests for changing from a fumed silica thickener in test 4C to a more polar polyamide thickener in test 5C reduced paint-over-problems from gross non- wetting to feather-edging only, but, nonetheless, only spray test 6 using N-methyl pyrrolidone fully solved the problem.

Example 6

A test was designed to exaggerate the difference between the "MS" based sealers and the paint types that exhibit either the feather edge or gross wetting problems, and to study the effect of these problems of adding to the sealer any one of a number of different conventional types of plasticizers, fillers, and stabilizers for sealers as compared to additives of this invention. Towards this object, the test was conducted as follows. The starting sealer polymer used was that under the tradename "MS S303" from Kanegafuchi Kagaku Kogyo Kabushiki Kaisha, Osaka Japan, and in each run, it was used alone or as mixed with the additive indicated in Table 2. More particularly, for each run, 100 grams of "MS S303" was mixed with the additive and amount described in the appendix to Table 2 in an air mixer and then allowed to stand 60 minutes to allow entrapped air bubbles to escape. Then, 20 grams of each mixture was added to an aluminum foil tray (5 cm in diameter) so that it filled the tray to a depth of about 2 mm. A Sikkens "AUTOBASE" paint was pre diluted with reducer as per manufacturer's recommendations. Using a dropping pipette, 15 drops of the Sikkens "AUTOBASE" paint were added uniformly across the surface of the mixture as independent spots, not as a pool, to form a thin film thereof in a paint film thickness of less than 0.5 mm. The paint film was allowed to dry/cure at room temperature and observed at different intervals. First, the wet-out was observed at 5 minutes to determine whether the paint had formed a cohesive film in place of the individual drops. The wet-out results are summarized for the additives summarized in Table 2. The paint was again observed after the paint had completed drying, which usually was accomplished after about at 1–2 hours, and the paint film was evaluated to see if it remained completely uniform or if it has wrinkled away at the edges or crinkled up from the uncured polymer system underneath. The results are summarized in Table 2 below.

This test was used as an indication of the particular additive's ability to reduce or eliminate paint cracking in a fully formulated product.

TABLE 2

| Additive | Wet out | Test result - Dry Paint Film Form |
|---|---|---|
| a | Poor | 1 |
| b | Poor | 1 |
| c | Poor | 1 |
| d | Poor | 1 |
| e | Good | 2 |
| f | Good | 2 |
| g | Good | 2 |
| h | Good | 2 |
| i | Good | 2 |

TABLE 2-continued

| Additive | Wet out | Test result - Dry Paint Film Form |
|---|---|---|
| j | Good | 3 |
| k | Good | 4 |
| l | Good | 4–5 |
| m | Good | 5 |
| n | Good | 2 |
| o | Good | 3 |
| p | Good | 3 |
| q | Good | 2 |
| r | Good | 2 |
| s | Good | 2 |
| t | Good | 2 |
| u | Good | 3–4 |
| v | Good | 3–4 |
| w | Good | 4–5 |
| x | Poor | 1 |
| y | Poor | 2 |
| z | Good | 2 |
| aa | Good | 2–3 |
| bb | Good | 5 |

Additive
a Control "MS S303" resin only, no additive
b Fluorochemical surfactant, 0.01 and 0.1%, 3M "FLUORAD FC430"
c Silicon surfactant, 0.1 and 1%, eg. Union Carbide "SILWET 7500"
d Polysiloxane surfactant, 0.1% and 0.5%, Byk Chemie, "BYK 320"
e Surfynols, 0.1 and 1%, Air Products "SURFYNOL 104PA"
f Acrylate copolymer leveller, 0. 1 and 3%, Monsanto "MODAFLOW"
g Tergitols, 0.1 and 1%, Union Carbide "TMN-3"
h Xylene, 2, 5 and 10%
i Methylethylketone, 2 and 5%
j Polyamide thickener, 2%, "DISLON 6500"
k N-methyl-2-pyrrolidone - 2%
l N-methyl-2-pyrrolidone - 3%
m N-methyl-2-pyrrolidone - 5%
n Propyl Acetate, 3%
o Gamma Butyrolactone, 3%
p Gamma Butyrolactone, 5%
q Diacetone alcohol, 3%
r Methanol, 3%
s Dipropylene glycol monomethylether, 3%
t Cyclohexanone, 3%
u Dimethylformamide, 3%, 5% or 10%
v Dimethyl sulfoxide, 3%
w Dimethyl sulfoxide, 5%
x Morpholine, 3%
y Morpholine, 5%
z Propylene carbonate, 3% or 5%
aa Phthalate plasticizer, 25, 50 or 100 parts per hundred resin
bb Phthalate plasticizer same as aa, but with 3% N-methyl-2-pyrrolidone.

The above additives having more than one amount indicated means that a separate run was made at each amount listed for that particular additive and that the result shown in Table 2 for that additive was found in common to all such amounts thereof.

In Table 2, for the wet out observation, good and poor are defined as follows:

Poor=the applied droplets of paint did not wet or spread across the resin surface remaining as spot even after 1 hour.

Good=as the paint droplets were applied, the paint quickly (less than 2 minutes) wetted out and spread across the resin surface with the droplets quickly forming a uniform film.

Figure 2:
FIG. 2 is a photograph showing a top view of a base coat dried of a comparative uncured sealer composition, as described in Example 6.
Figure 3:
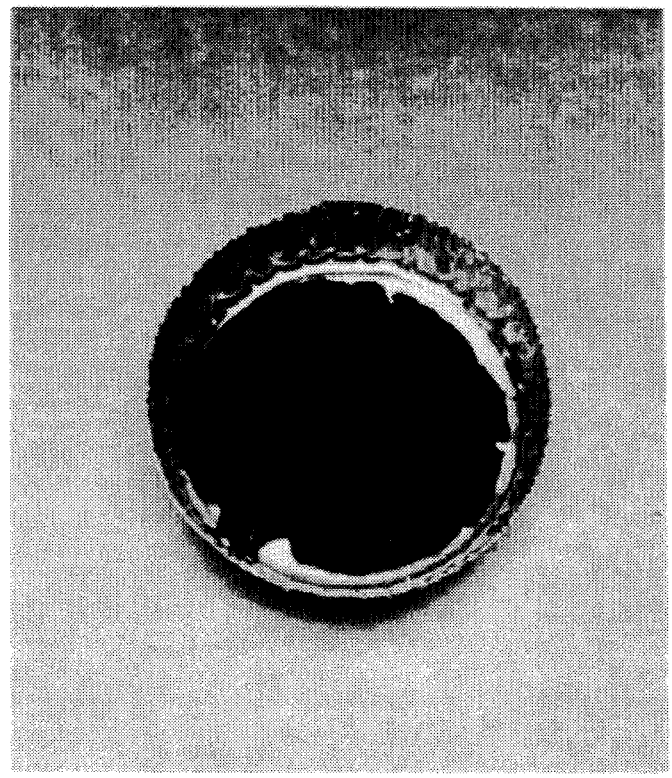
FIG. 3 is a photograph showing a top view of a base coat dried of an uncured sealer composition of the present invention, as described in Example 6.

Key to Dry Film Appearance
1=Poor/no film
2=Medium to heavy wrinkles
3=Lightly wrinkled
4=Very light wrinkles/nearly undetectable
5=Perfect film An illustration of a category "1" type of film is shown in FIG. 1. An illustration of a category "3" type of film is shown in FIG. 2. An illustration of a category "5" type of film is shown in FIG. 3.

The listing of more than one grade number for the dry paint appearance results in the examples herein means characteristics of both criteria were observed in the paint surface.

For purposes of this invention, the dry paint film appearance achieved, preferably, should be at least 4 in at least part of the paint surface without any 1 or 2 gradings possible. The results in Table 2 show that only the runs in this example using N-methyl pyrrolidone, dimethylsulfoxide, or dimethyl formamide provided acceptable wet-out and dry paint appearance. The conventional surfactants, thickeners, levellers and wetting agents investigated did not meet all the criteria of the invention.

Example 7

Example 6 was repeated except that the dry paint appearance for materials having different Snyder selectivity group categorizations and different Snyder's polarity values dispersed over a wide range of values were specifically examined against additives of this invention having a Group III Snyder selectivity group categorization and a Snyder's polarity value in the range from 6.2 to 7.3. The wet-out property was not investigated for this example. The solvent added, if any, to the "MS S303" sealer in each run is described after Table 3 and the Snyder's selectivity group and polarity (if known) for the solvent additive and dry paint result for each run is summarized in Table 3. Runs B-P in Table 3 involved addition of 3% by weight of the particular solvent investigated, based on the total weight of the sealer and solvent mixture. Different amounts of the particular additive were investigated for runs Q, R, S, T and U, as indicated below.

TABLE 3

| Solvent Run | Snyder Selectivity Group | Snyder's Polarity | Dry Paint Appearance |
|---|---|---|---|
| A | none | — | 1 |
| B | VII | 2.55 | 2 |
| C | III | 4.28 | 2 |
| D | VI | 4.72 | 2 |
| E | VI | 4.72 | 2 |
| F | III | 5.53 | 3 |
| G | VI | 5.64 | 3 |
| H | III | 5.71 | 2 |
| I | IV | 6.06 | 2 |
| J | IV | 6.13 | 3 |
| K | VI | 6.27 | 3 |
| L | III | 6.31 | 3–4 |
| M | III | 6.45 | 4–5 |
| N | III | 6.45 | 5 |
| O | III | 7.29 | 5 |
| P | VIII | 7.55 | 3 |
| Q* | — | — | 1 |
| R* | — | — | 1 |
| S* | — | — | 1 |
| T | ~VI | 6.31 | 2(3) |
| U** | IV | 6.9 | 2(3) |

*: Snyder selectivity group and polarity values not reported in current literature.
**: Snyder selectivity group and polarity values as estimated values only, as reported in J. Chromatographic Sci., vol. 16, June 1978, pp. 223, 226.
Solvents
A None
B Xylene
C Tetrahydrofuran
D Methylethylketone
E Cyclohexanone TABLE 3-continued

| Solvent Run | Snyder Selectivity Group | Snyder's Polarity | Dry Paint Appearance |
|---|---|---|---|
| F Pyridine | | | |
| G Acetonitrile | | | |
| H Methoxy ethanol | | | |
| I Benzyl alcohol | | | |
| J Acetic acid | | | |
| K Gamma butyrolactone | | | |
| L Dimethyl formamide | | | |
| M Dimethylacetamide | | | |
| N N-methyl pyrrolidone | | | |
| O Dimethyl sulfoxide | | | |
| P Trifluoroethanol | | | |
| Q Thiophene 5% | | | |
| R Triethanolamine 3% and 5%; same results each formulation | | | |
| S Morpholine 3% and 5%; same results each formulation | | | |
| T Aniline 3% (5% results) | | | |
| U Ethylene glycol 3% (5% results) | | | |

Key - Dry Film Appearance
1 = Poor/no film
2 = Medium to heavy wrinkles
3 = Lightly wrinkled
4 = Very light wrinkles/nearly undetectable
5 = Perfect film This test exaggerated the worst paint incompatibility case for each of the additives investigated for inclusion in the sealer composition. The paint film achieved with comparison Run A having a dry paint grade of 1 is represented in FIG. 1; the paint film achieved with comparison Run C having a dry paint grade of 2 is represented in FIG. 2; and the paint film achieved by Run N having a dry paint grade of 5 and representing the present invention is shown in FIG. 3.

As shown in Table 3, the diverse and numerous solvents investigated in runs B–J and P having Snyder's polarity values either below or above the range of 6.2 to 7.3, as added to the sealer composition, yielded unacceptable dry paint appearance and failed to solve the paint feathering problem. Likewise, runs K, T and U using solvent additives which had a Snyder's polarity in the range of 6.2 to 7.3 but are classified in a Snyder selectivity group other than group III, also yielded unacceptable dry paint appearance and failed to solve the paint feathering problem. By contrast, only runs using solvent additives L–O, which additives each have a Snyder's polarity in the range of 6.2 to 7.3 and are classified in Snyder selectivity group III, all provided a dry paint appearance of at least 4 in at least a portion of the paint surface and solved the paint feathering problem.

Example 8

Example 7 was repeated except that the 100 grams "MS303" was replaced by a mixture of 50 grams "SILMOD SAT30"/50 grams "MS303". The results were the same as those summarized in Table 3.

Example 9

Example 7 was repeated except that the 100 grams "MS303" was replaced by 100 grams "SILMOD SAT10". The results were the same as those summarized in Table 3.

Example 10

Another experiment was conducted to investigate the effect on the rate of cure in sealer formulations by adding N-methyl pyrrolidone. The effect was demonstrated by the depth of cure (in millimeters) observed for two identical sealer formulations except that the one contains 3% by total weight of N-methyl pyrrolidone. The test method used was a cure accomplished "in jig". The sealer formulations used comprised Sealer CS, which was a caulk of Example 2 except without any N-methyl pyrrolidone being added, and a sealer SP, which was a caulk made according to Example 2. Each sealer was filled into a mould or jig that is 300 mm long by 18 mm wide and at one end has 0 mm depth which increased to approximately 13 mm depth at the other end by employing a 1/30 gradient along the jig length. The jig was filled and the sealer was smoothed to its surface. The jig was then placed in a CT room (24° C. and 50% RH) to cure. Readings were taken periodically by peeling back the film of curing sealer and noting the point at which cure had not yet occurred. This was observed as a wet layer of sealer under the cured surface. The results are summarized in Table 4 below which summarizes the total depth of cure in the sealers in millimeters as a function of total cure time in hours.

TABLE 4

| Sealer | Cure Time (hrs) | | | | | |
|---|---|---|---|---|---|---|
| | 17 | 25 | 41 | 67 | 76 | 142 |
| | Depth of Cure (mm) | | | | | |
| CS | 2.37 | 2.87 | 3.63 | 4.67 | 5.27 | 7.53 |
| SP | 3.97 | 4.73 | 5.77 | 7.17 | 7.8 | End |

The description "end" in Table 4 means full 8 mm depth of cure through the sealer. As shown in the results of Table 4, Sealer SP containing the N-methyl pyrrolidone and representing the present invention showed a marked improvement in the rate of depth of cure through the seam sealer as compared to Sealer CS which did not contain the N-methyl pyrrolidone.

Example 11

The effect of the invention was further shown in another type of sealer composition as follows. Example 6 was repeated except that 100 grams silylated urethane was used in place of the 100 grams "SILMOD S303" component. Three test runs designated SC, S1 and S2 corresponding to additions of 0%, 3% and 5% N-methyl pyrrolidone, respectively, were investigated in this regard. In particular, a silylated polyurethane was prepared for each run as follows: 100 grams of a 15,000 molecular weight polyether polyol having a hydroxyl number of 7.76 was added to 3.26 grams of gamma-isocyanate propyl trimethoxy silane and heated at 60° C. with stirring for 6 hours. The resultant silylated urethane showed no free NCO by a titration test or by F.T.I.R. spectra analysis. The sealer of each test run was evaluated with a Sikkens "AUTOBASE" base coat described elsewhere herein and scored in the same manner as in Example 6. The results are summarized in Table 5 below.

TABLE 5

| Test Run | Dry Paint Appearance |
|---|---|
| SC | 1 |
| S1 | 3–4 |
| S2 | 4–5 |

As shown by the results in Table 5, the unexpected effects associated with addition of a solvent additive of this invention are also achieved in silylated urethane sealer compositions.

While the invention has been described by reference to various specific and preferred embodiments and techniques, it is understood that many variations and modifications can be made thereto without departing from the spirit and scope of the invention.

What is claimed is:

1. A curable sealer and/or adhesive composition comprising:

(a) a polyoxyalkylene polymer having silicon-containing hydrolyzable end groups, wherein said polyoxyalkylene polymer comprises a structural unit of the formula (I): $-(R^1O)_q$ (I), where $R^1$ is an alkylene group having 1 to 4 carbon atoms and q is an integer providing an average molecular weight for formula (I) of from about 500 to about 20,000 and a viscosity of from about 100 to 200,000 cps at 15° C., and each said silicon-containing hydrolyzable end group having the general formula (II):

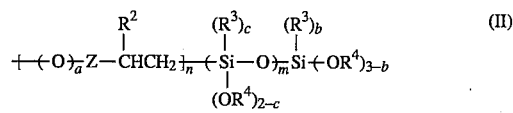

wherein Z is —R—, —R—O—R"—, —R—O—C(O)—, —C(O)NHR—, —C(O) NH—X—NHC(O)—NR"—R—, —C(O) NH—X—NHC(O)—O—R—, —C(O) NH—X—NHC(O)—S—R—, or —C(O)—R—, where R and R" are the same or different and each is a bivalent hydrocarbon group having 1 to 20 carbon atoms, X is an alkylene or aryl group having 1 to 20 carbon atoms, $R^2$ is a hydrogen, a hydrocarbon group having 1–20 carbon atoms, or a triorganosiloxy group, $R^3$ is a substituted or unsubstituted monovalent group having 1–20 carbon atoms or an organosiloxy group, $R^4$ is a saturated or unsaturated monovalent hydrocarbon group having 1–20 carbon atoms, a is 0 or 1, b is 0, 1 or 2, c is 0, 1, or 2, n is 0 or 1 and m is an integer between 0 to 18; and (b) a polar organic solvent material having a Snyder's polarity value in the range from 6.2 to 7.3 and belonging to Snyder's selectivity group III, wherein said polar organic solvent material is contained in an amount of from 1 to 5 parts by weight per 100 parts by weight of said sealer and/or adhesive composition, and wherein said polar organic solvent material is contained in an amount of from 1 to 10 parts by weight per 100 parts by weight said polyoxyalkylene polymer having a silicon-containing hydrolyzable group.

2. The curable sealer and/or adhesive composition of claim 1, wherein said polar organic solvent material has a Snyder's polarity value from 6.45 to 7.2.

3. The curable sealer and/or adhesive composition of claim 1, wherein said polar organic solvent material comprises N-methyl-2-pyrrolidone.

4. The curable sealer and/or adhesive composition of claim 1, wherein said polar organic solvent material comprises dimethylsulfoxide.

5. The curable sealer and/or adhesive composition of claim 1, wherein said polar organic solvent material comprises N,N-dimethylacetamide.

6. The curable sealer and/or adhesive composition of claim 1, wherein said polar organic solvent material comprises N,N-dimethylformamide.

7. The curable sealer and/or adhesive composition of claim 1, wherein said polar organic solvent comprises an average solvent selectivity to methylethylketone ($X_m$) of 0.23±0.01 and an average solvent selectivity to toluene ($x_t$) of 0.13±0.02.

8. The curable sealer and/or adhesive composition of claim 1, wherein b is 1 and $R^4$ is a methyl group.

9. The curable sealer and/or adhesive composition of claim 1, wherein said polyoxyalkylene polymer comprises polypropylene polyether.

10. The curable sealer and/or adhesive composition of claim 1, wherein said polyoxyalkylene polymer has an average molecular weight between 3,000 to 12,000.

11. The curable sealer and/or adhesive composition of claim 1, wherein said polyoxyalkylene polymer contains at least 50% by weight of said —$R^1$O— units of formula (I).

12. The curable sealer and/or adhesive composition of claim 1, said polyoxyalkylene polymer and said polar organic solvent material being uniformly mixed together.

13. A curable sealer and/or adhesive composition comprising:

(a) a polyoxyalkylene polymer having silicon-containing hydrolyzable end groups, said polyoxyalkylene polymer comprising a structural unit of the formula (I): $-(R^1O)_q$ (I), where $R^1$ is an alkylene group having 1 to 4 carbon atoms and q is an integer providing an average molecular weight for formula (I) of from about 500 to about 20,000 and a viscosity of from about 100 to 200,000 cps at 15° C., and each said silicon-containing hydrolyzable end group having the general formula (II):

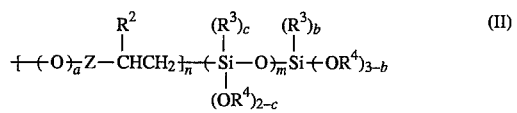

wherein Z is —R—, —R—O—R"—, —R—O—C(O)—, —C(O) NHR—, —C(O) NH—X—NHC(O)—NR"—R—, —C(O)NH—X—NHC(O)—O—R—, —C(O) NH—X—NHC(O)—S—R—, or —C(O)—R—, where R and R" are the same or different and each is a bivalent hydrocarbon group having 1 to 20 carbon atoms, X is an alkylene or aryl group having 1 to 20 carbon atoms, $R^2$ is a hydrogen, a hydrocarbon group having 1–20 carbon atoms, or a triorganosiloxy group, $R^3$ is a substituted or unsubstituted monovalent group having 1–20 carbon atoms or an organosiloxy group, $R^4$ is a saturated or unsaturated monovalent hydrocarbon group having 1–20 carbon atoms, a is 0 or 1, b is 0, 1 or 2, c is 0, 1, or 2, n is 0 or 1 and m is an integer between 0 to 18; and (b) a polar organic solvent material selected from the group consisting of N-methylpyrrolidone, dimethylsulfoxide, dimethylacetamide, and dimethylformamide, and wherein said polar organic solvent material is contained in an amount of from 1 to 5 parts by weight per 100 parts by weight of said sealer and/or adhesive composition, and wherein said polar organic solvent material is contained in an amount of from 1 to 10 parts by weight per 100 parts by weight said polyoxyalkylene polymer having a silicon-containing hydrolyzable group.

14. The curable sealer and/or adhesive composition of claim 13, wherein b is 1 and $R^4$ is a methyl group.

15. The curable sealer and/or adhesive composition of claim 13, wherein said polyoxyalkylene polymer comprises polypropylene polyether.

16. The curable sealer and/or adhesive composition of claim 13, wherein said polyoxyalkylene polymer has a molecular weight between 3,000 to 12,000.

17. The curable sealer and/or adhesive composition of claim 13, wherein said polyoxyalkylene polymer contains at least 50% by weight of said —$R^1O$— units of formula (I).

18. The curable sealer and/or adhesive composition of claim 13, said polyoxyalkylene polymer and said polar organic solvent material being uniformly mixed together.

* * * * *